R. P. GREENLEAF.
LOADING MACHINE.
APPLICATION FILED APR. 27, 1918.

1,297,150.

Patented Mar. 11, 1919.
4 SHEETS—SHEET 2.

Inventor
Robert P. Greenleaf
By Thurston & Knox
attys

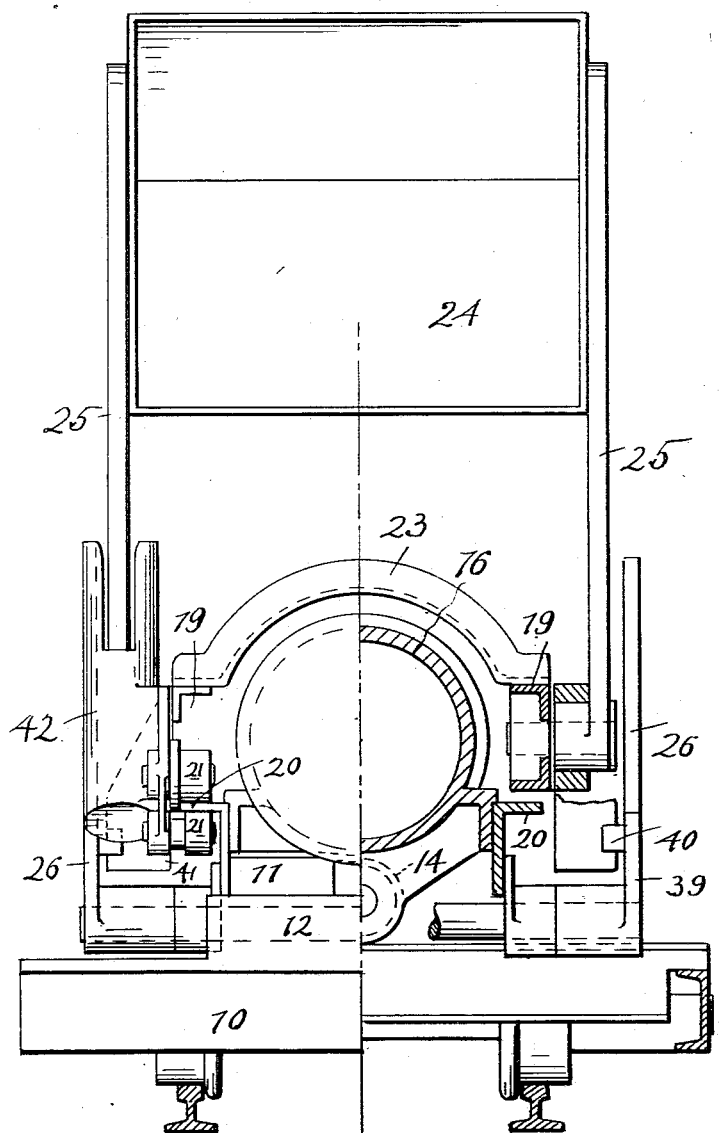

R. P. GREENLEAF.
LOADING MACHINE.
APPLICATION FILED APR. 27, 1918.

1,297,150.

Patented Mar. 11, 1919.
4 SHEETS—SHEET 4.

Inventor,
Robert P. Greenleaf
By Thurston + Bates
Attys

UNITED STATES PATENT OFFICE.

ROBERT P. GREENLEAF, OF CLEVELAND, OHIO, ASSIGNOR TO FRANK BILLINGS, OF CLEVELAND, OHIO.

LOADING-MACHINE.

1,297,150.

Specification of Letters Patent.

Patented Mar. 11, 1919.

Application filed April 27, 1918. Serial No. 231,072.

*To all whom it may concern:*

Be it known that I, ROBERT P. GREENLEAF, a citizen of the United States, residing at Cleveland, in the county of Cuyahoga and State of Ohio, have invented a certain new and useful Improvement in Loading-Machines, of which the following is a full, clear, and exact description.

This invention relates to improvements in loading machines, particularly those used in mines where the head room is limited.

The invention has for its chief object the provision of an efficient, simple and powerful machine of the type including a shovel which is moved forward to receive a load and is then retracted and swung over the machine so as to dump the load at the rear thereof.

A further object is to provide a machine with a powerful filling thrust and lifting action and with a quick return of the shovel to filling position in front of the machine.

The above and other more specific objects are attained by the present invention, which may be briefly summarized as consisting in certain novel details of construction and combinations and arrangements of parts which will be described in the specification and set forth in the appended claims.

Figure 1:
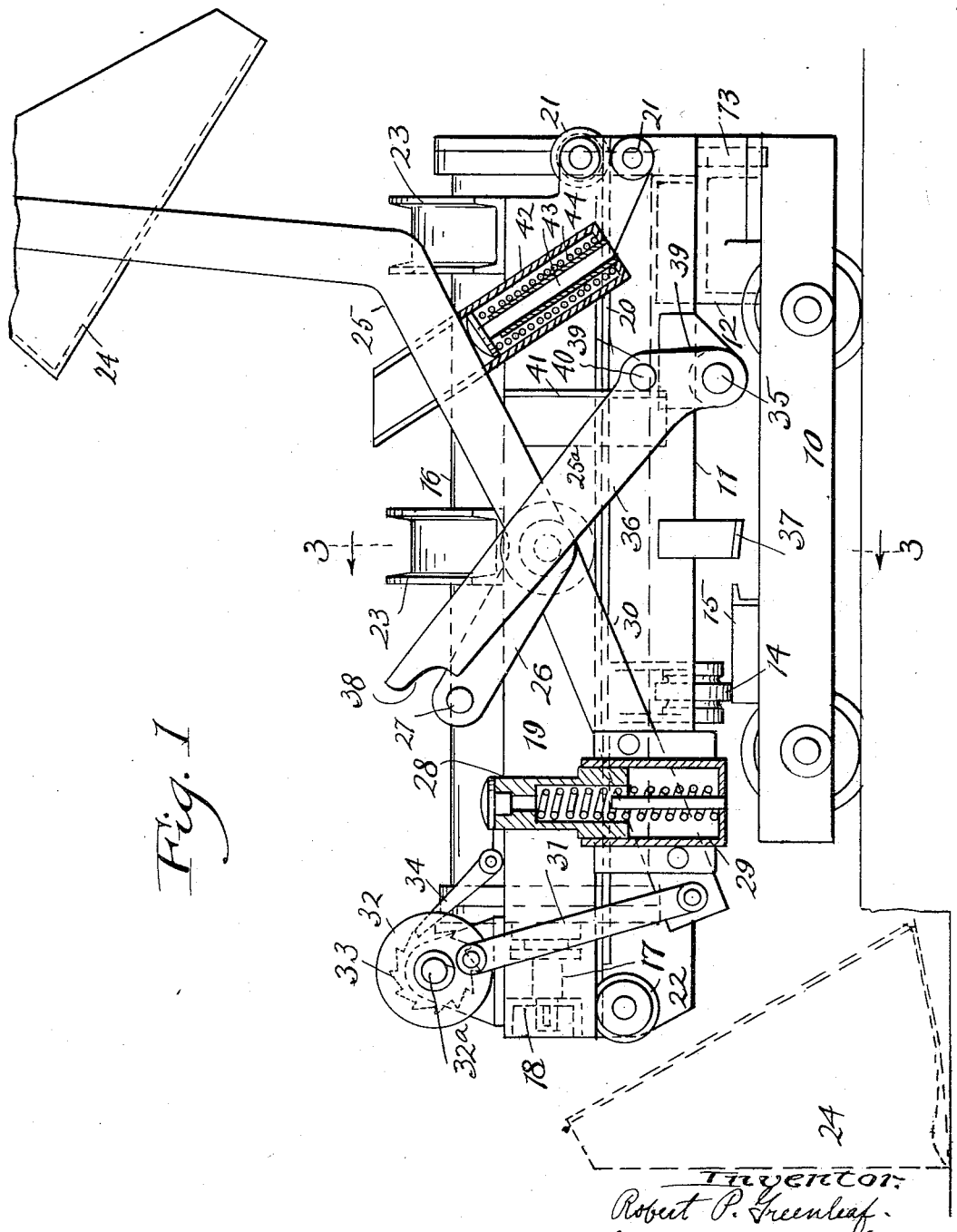
Figure 2:
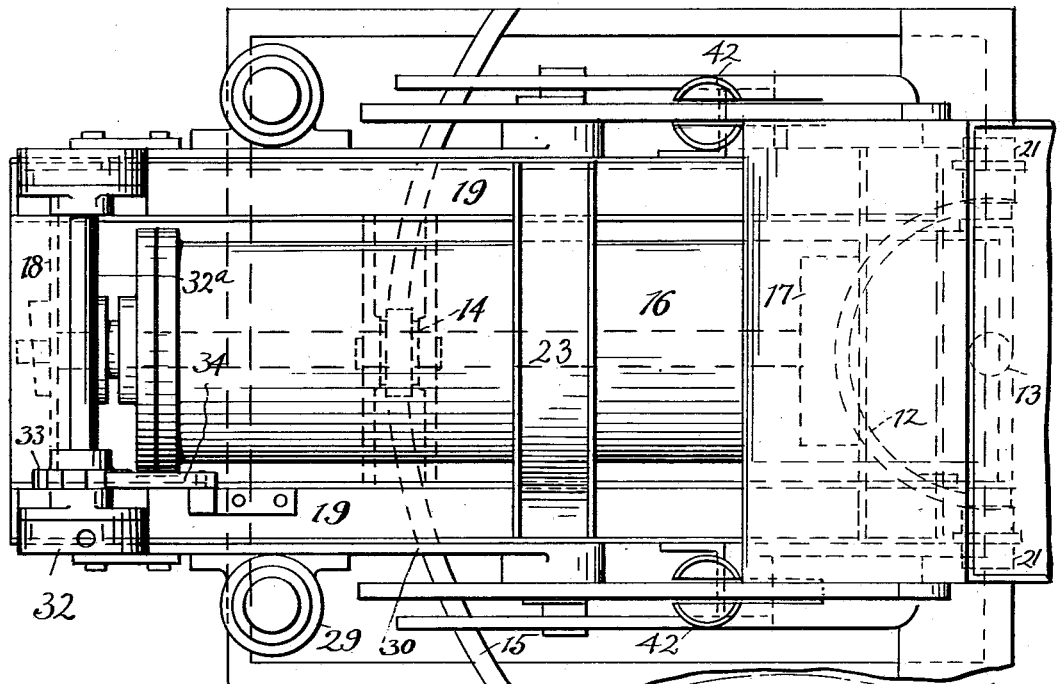
Figure 4:
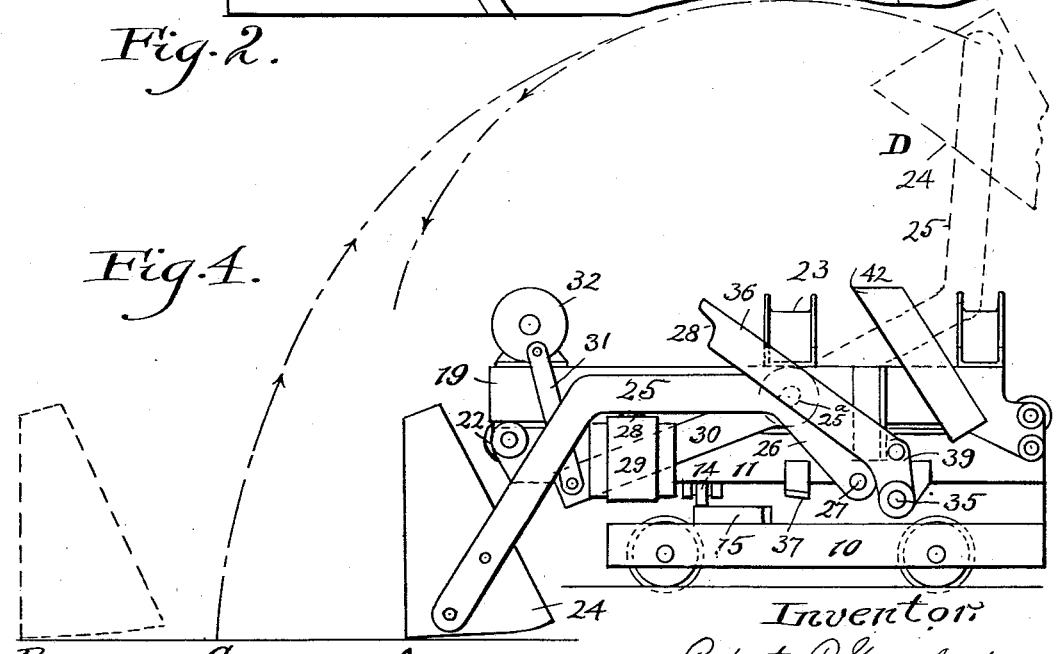
Figure 7:
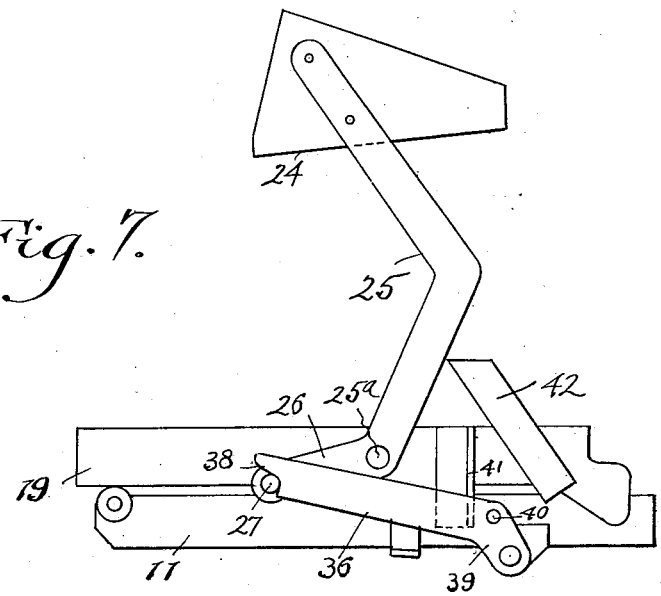
Figure 6:
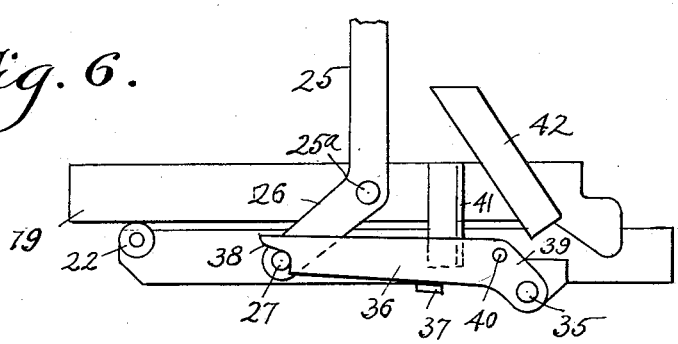
Figure 5:
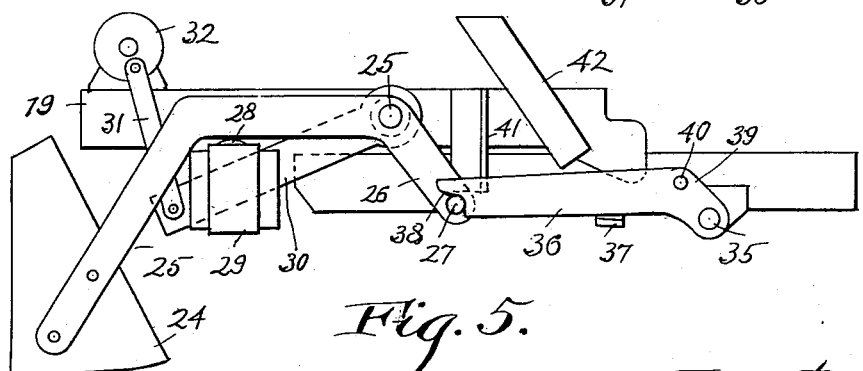

In the accompanying sheets of drawings, wherein I have shown an embodiment of my invention which operates with high efficiency, Figure 1 is a side view of the machine with the shovel in dumping position and with the ram fully retracted, parts being in section; Fig. 2 is a top plan view of the same; Fig. 3 is a view partly in end elevation looking toward the rear of the machine, and partly in section substantially along the line 3—3 of Fig. 1, looking in the direction indicated by the arrows; Fig. 4 is a side view on a reduced scale showing by full lines the shovel at the start of the filling stroke, and showing by dotted lines the path of movement of the shovel as it passes through its cycle of movement; Figs. 5, 6 and 7 are diagrammatic views showing particularly the action and relative positions of the shovel supporting arms and tilting or rocking levers in three positions of the shovel, namely, the beginning of the tilting movement, the tilting movement about three-fourths finished, and the tilting movement nearly finished.

Referring now to the drawings, 10 represents a truck frame having wheels adapted to run on a track, such as the track of a mine. Mounted on this truck frame is a turntable 11 supported at its rear end on the truck by a segment 12 and a vertical pivoting pin 13, and supported at its forward portion by a roller 14 which engages an arc shaped track 15 on the truck concentric with respect to the pin 13 about which the turntable, and in fact, the entire superstructure of which the turntable is a part turns on the truck.

This turntable carries a motor which in this case is an air or other suitable fluid pressure reciprocating motor having a fairly long horizontal cylinder 16 which extends centrally of the turntable. This motor has a plunger 17 which at its forward end is connected to the front cross member 18 of a reciprocating ram which includes in addition to the cross member 18, two parallel ram members 19, 19, which extend alongside of the motor cylinder, and are guided for reciprocating movement forwardly and rearwardly of the turntable. The guiding and supporting means for the ram in this case includes trackways 20 on opposite sides of the motor cylinder and engaged by upper and lower rollers 21 at the rear ends of the ram members 19, and also front rollers 22 which are carried by the forward part of the turntable and engage the under sides of the ram members 19.

The two ram members 19 are connected together so as to move in unison and so as to form a rigid structure by curved bridge pieces 23 which extend from one ram member to the other over the motor cylinder, and they are connected together at their forward ends by the cross piece 18 as already explained.

These reciprocating ram members support and actuate a material digging and conveying member, here shown in the form of a shovel 24 which is pivotally connected to the ram members 19 by a pair of swinging shovel arms 25 which are somewhat U-shaped, as clearly shown in Fig. 1, these arms being pivotally connected at 25ª to the ram members 19 at about the middle of the latter. When the shovel is in digging position the arms extend substantially horizontally forward from the pivot points, and then diagonally downward to the shovel. Beyond or at the rear of the pivot points these arms 25 have extension arms 26 with laterally projecting pins 27 at their free ends.

Near the front of the machine in the plane of the swinging movement of the arms 25 are spring-pressed plungers 28, which, as will be subsequently explained, break the fall of the shovel and shovel supporting arms when the latter swing from dumping position to filling or loading position in front of the machine. These plungers are received in cylinders 29, the position of which can be adjusted to vary the normal height of the shovel during the filling stroke. In this case, these cylinders are attached to arms 30 which are pivotally connected at 25ᵃ (the axis about which the shovel arms turn) to the ram members 19. The forward ends of these arms 30 are connected by links 31 to disks 32 which are connected together by a cross shaft 32ᵃ, one of these disks having a ratchet 33 adapted to be engaged by a pawl 34 mounted on one of the ram members. The disk 32 may be turned like a capstan to adjust the height of the arms 30 and of the dash pot cylinders 29, and after adjustment the pawl 34 will hold the parts at the right height.

When the ram is retracted and the shovel is in front of the machine with the arms 25 resting on the dash pot plungers, all parts are at the beginning of the digging stroke, and when the ram is moved forwardly, the shovel will be filled with material, and after the completion of the forward stroke the motor is reversed causing the ram to be retracted, the loaded shovel and the associated parts then moving rearwardly toward the machine.

In addition to the parts above described, I provide means whereby during the retraction of the ram and when the loaded shovel is still some distance from the front of the machine, a powerful lifting and tilting effect is obtained, causing the shovel and the shovel supporting arms to be rotated about their pivotal axis on the ram until the shovel reaches dumping position, shown in full lines in Fig. 1, the power of the reciprocating motor being utilized for this purpose. This is accomplished by the following mechanism. I pivotally mount at 35 on the lower rear sides of the turntable, arms 36, these arms normally extending horizontally forward from the pivotal points, and resting on brackets 37 which are secured to the turntable. At the forward ends of these arms are notches forming jaws 38 which are designed to be engaged by the laterally extending pins 27 on the extension arms 26 of the shovel supporting arms 25, when the ram is retracted to a certain point. The arms 36 are in the nature of bell cranks, each being provided with an upstanding portion 39, with an inwardly projecting pin 40. These pins 40 are adapted to be engaged by abutments 41 fixed to the ram members 19, this engagement taking place when the ram is substantially at the end of its rearward movement or is substantially fully retracted and when the shovel is in dumping position substantially as shown in Fig. 1, and causing the arms 36 to be rocked out of engagement with the pins 27.

Additionally I provide on the sides of the ram members 19, inclined cylinders 42 which are slotted, these slots being entered by the swinging arms 25 as the latter approach the end of their rearward swinging stroke, this being illustrated in Fig. 1. In each cylinder is a plunger 43 which is engaged by a corresponding arm 25 and depressed when the arm enters the slot of the cylinder, and between the head of the plunger and the bottom of the cylinder is a coil spring 44 which is compressed by the depression of the plunger.

The machine above described, operates in the following manner: Assuming that the shovel is in front of the machine at the position indicated at A in Fig. 4, with the arms 25 resting on the forward plungers 28, the ram is moved forwardly into the material causing the shovel to be filled. After a predetermined forward movement, which is usually the full length of the stroke of the motor, (shovel then in position B Fig. 4), or less than the full stroke if desired, the motor is reversed, whereupon the ram is retracted, drawing back the loaded shovel. When the shovel is retracted about half the distance that it was moved forwardly, i. e., position C of Fig. 4, the rearwardly traveling pins 27 on the arm extensions 26 of the shovel supporting arms 25 engage the notches or jaws at the forward ends of the arms 36 and immediately the shovel and shovel supporting arms are by reason of this engagement caused to swing upwardly and rearwardly over the machine. It should be noted that a powerful lifting effect is imparted to the shovel because of the large leverage which is obtained through the length of the arm extensions 26. This swinging movement continues, the arms 26 now swinging about their pivotal points and the arms 36 likewise swinging upwardly about their pivotal axes until the shovel reaches substantially the full line position in Fig. 1, and the dotted line position D in Fig. 4, which is the dumping position, and when this is reached the abutments 41 carried by the rearwardly moving ram engage the pins 40 on the extensions 39 of the arms 36 and swing the jaws or notched portions of the arms 36 out of engagement with the pins 27 on the shovel arm extensions 26. Meanwhile the arms 25 have entered the slotted cylinders 42 and have powerfully compressed the springs 44 so that as soon as the pins 27 are released from the notches of the arms 38, these springs throw the now emptied shovel 24 and the arms 25 forwardly until the center of gravity is past the vertical center line through the pivotal axis of the arms, whereupon the shovel and shovel supporting arms 25 drop by gravity to digging position, ready for the next filling stroke. As the shovel and shovel arms fall in the manner stated, the arms engage the spring pressed plungers 28, and the shovel is therefore stopped in the position stated, without material shock.

As soon as the ram starts on the next filling stroke the arms 26 which by their engagement with the pins 27 cause the swinging or turning movement to take place, drop by gravity down onto the brackets 27 and remain in that position until the next rearward stroke when they are again engaged by the pins 27 and turn the shovel and shovel supporting arms as above described.

The chief advantages of this machine are its simplicity in view of the fact that a single motor is required to impart the various movements to the shovel; also the fact that a powerful lifting action is obtained at the start of the lifting stroke, the turning moment gradually decreasing as the shovel approaches the upright position over the machine, due to the fact that the effective leverage of the arms 26 gradually decreases.

While I have shown only one embodiment of my invention, it will be obvious that changes may be made in details of construction without departing from the spirit and scope of my invention in its broadest aspects.

Having described my invention, I claim:

1. In a loading machine, a supporting frame, a shovel, a forwardly and rearwardly moving device carried by the frame, a shovel supporting member connecting the shovel to said device so that the shovel and said supporting member may be swung over the machine during the retraction of said device, a tilting member adapted to be engaged by a part on said shovel supporting member during the rearward movement of said device, and means for causing disengagement of the shovel supporting member and the tilting member when the shovel is in substantially dumping position.

2. In a loading machine, a frame, a shovel, means for actuating said shovel so that it can be moved forwardly and then retracted and swung over the machine to dump the material at the rear thereof, said means comprising a forwardly and rearwardly moving device carried by the frame, a shovel supporting arm pivotally connected to said device, a pivoted tilting member supported by the frame, said pivoted tilting member being normally stationary and serving as an abutment adapted to be engaged by a portion of said arm to swing the arm and the shovel during the retraction of said device.

3. In a loading machine, a frame, a shovel, means for actuating said shovel so that it can be moved forwardly and then retracted and swung over the machine to dump the material at the rear thereof, said means comprising a forwardly and rearwardly moving device carried by the frame, a shovel supporting arm pivotally connected to said device, a tilting member supported by the frame and serving as an abutment adapted to be engaged by a portion of said arm to swing the arm and the shovel over the frame during the retraction of said device, and means for causing disengagement of said arm and tilting member when the shovel has been swung to a certain position over the machine and is at substantially dumping position.

4. In a loading machine, a frame, a shovel, means for actuating said shovel so that it can be moved forwardly and then retracted and swung over the machine to dump the material at the rear thereof, said means comprising a forwardly and rearwardly moving device carried by the frame, a shovel supporting arm pivotally connected to said device, a tilting member supported by the frame, and serving as an abutment adapted to be engaged by a portion of said arm to swing the arm and the shovel during the retraction of said device, means for causing disengagement of said arm and tilting member when the shovel has been swung to a certain position over the machine, and means for causing the shovel and its supporting arm to be swung forwardly after said disengagement to cause the shovel to move to digging position.

5. In a loading machine, a supporting frame, a shovel, means for actuating the shovel so as to move the same forwardly to receive a load and then to retract the same and cause the shovel to be swung over the machine to dumping position, said means comprising a ram movable forwardly and rearwardly with respect to the frame, a shovel supporting arm connected to the shovel and pivotally connected to the ram and having an extension, a tilting arm carried on the frame in position to be engaged by said extension when the ram is retracted to a given point, whereby on the further retraction of the ram said supporting arm and shovel will be swung over the machine.

6. In a loading machine, a supporting frame, a shovel, means for actuating the shovel so as to move the same forwardly to receive a load and then to retract the same and cause the shovel to be swung over the machine to dumping position, said means comprising a ram movable forwardly and rearwardly with respect to the frame, a shovel supporting arm connected to the shovel and pivotally connected to the ram and having an extension, a tilting arm carried by the frame in position to be engaged by said extension when the ram is retracted to a given point whereby on the further retraction of the ram said supporting arm and shovel will be swung over the machine, and means whereby when the shovel reaches substantially the dumping position, said tilting arm is moved out of engagement with said extension of the shovel supporting arm.

7. In a loading machine, a supporting frame, a shovel, means for actuating the shovel so as to move the same forwardly to receive a load and then to retract the same and cause the shovel to be swung over the machine to dumping position, said means comprising a ram movable forwardly and rearwardly with respect to the frame, a shovel supporting arm connected to the shovel and pivotally connected to the ram and having an extension, a tilting member carried on the frame in position to be engaged by said extension when the ram is retracted to a given point whereby on the further retraction of the ram said arm and shovel will be swung over the machine, means whereby when the shovel reaches substantially the dumping position, said extension of the shovel supporting arm and tilting member are disengaged, and means independent of the ram for causing the shovel and supporting arm to be swung forwardly so that they may then drop by gravity to filling position.

8. In a loading machine, a frame, a shovel, means for actuating the shovel so that it will have a forward filling movement and will then be retracted and swung over the machine to dumping position, said means comprising a forwardly and rearwardly moving ram carried by the frame, and arms connected to the shovel and pivotally connected to the ram, said arms having extensions constituting tilting levers, pivoted tilting arms carried by the frame in position to be engaged by said extensions when the ram is retracted to a given point so that during the further retraction of the ram the arms and shovel will be swung upwardly and rearwardly over the machine.

9. In a loading machine, a frame, a shovel, means for actuating the shovel so that it will have a forward filling movement and will then be retracted and swung over the machine to dumping position, said means comprising a forwardly and rearwardly moving ram carried by the frame, an arm connected to the shovel and pivotally connected to the ram, said arm having an extension constituting a tilting lever, a pivoted tilting arm carried by the frame in position to be engaged by said extension when the ram is retracted to a given point so that during the further retraction of the ram the arm and shovel will be swung upwardly and rearwardly over the machine, and means carried by the ram for rocking said tilting arm out of engagement with said extension.

10. In a loading machine, a frame, a shovel, means for actuating the shovel so that it will have a forward filling movement and will then be retracted and swung over the machine to dumping position, said means comprising a forwardly and rearwardly moving ram carried by the frame, arms connected to the shovel and pivotally connected to the ram, said arms having extensions constituting tilting levers, pivoted tilting members carried by the frame in position to be engaged by said extensions when the ram is retracted to a given point so that during the further retraction of the ram the arms and shovel will be swung upwardly and rearwardly over the machine, means carried by the ram for rocking said tilting members out of engagement with said extensions, and means for swinging the arms and shovel forwardly when the disengagement between the tilting members and said extensions takes place.

In testimony whereof, I hereunto affix my signature.

ROBERT P. GREENLEAF.